Feb. 23, 1971  A. W. BLACKMAN, JR  3,566,297
LASER DEVICE
Filed May 23, 1968
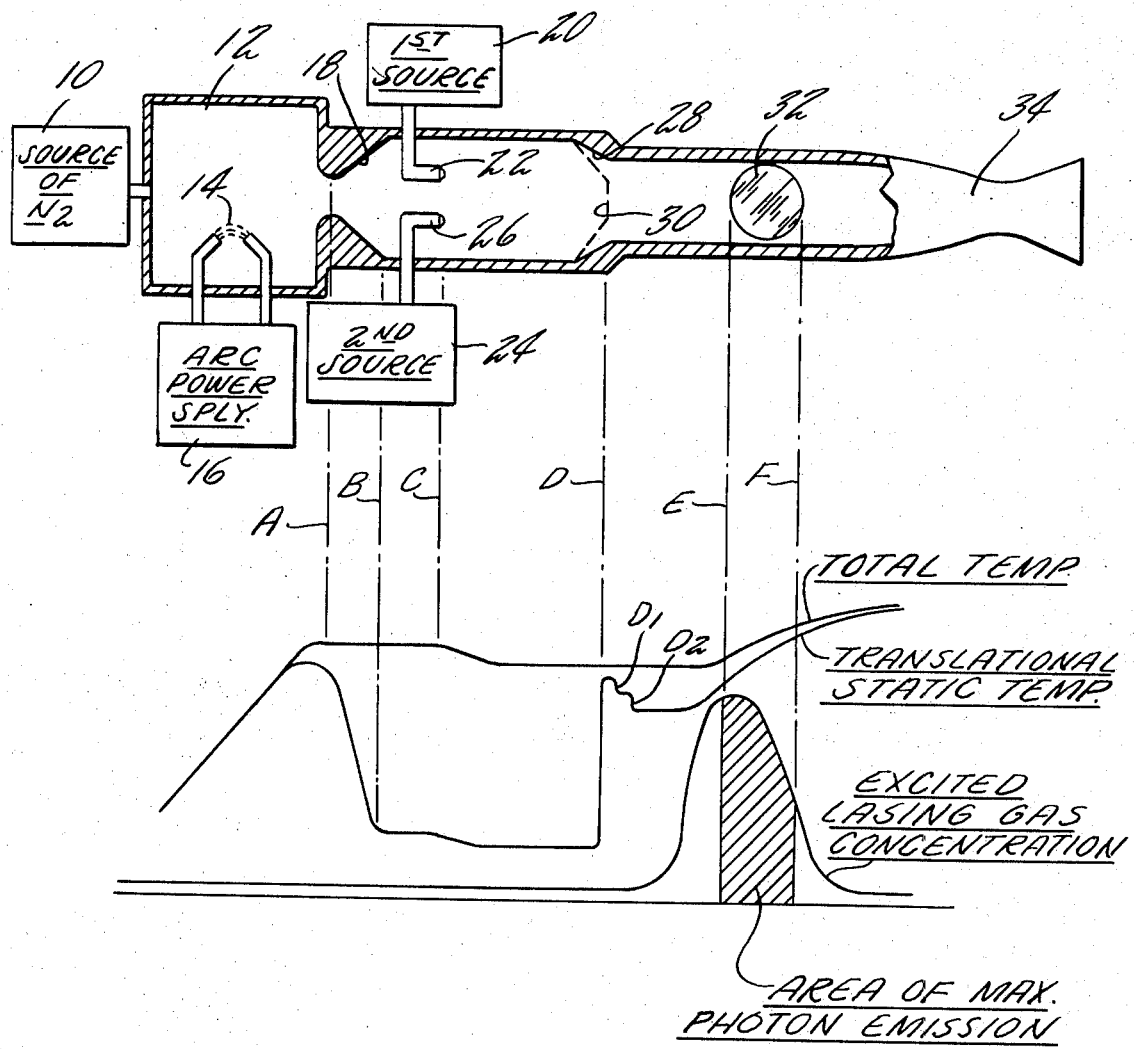
INVENTOR
ARTHUR WADE BLACKMAN
BY Melvin Pearson Williams
ATTORNEY United States Patent Office 3,566,297
Patented Feb. 23, 1971

3,566,297
LASER DEVICE
Arthur Wade Blackman, Jr., Hartford, Conn., assignor to United Aircraft Corporation, East Hartford, Conn., a corporation of Delaware
Filed May 23, 1968, Ser. No. 731,660
Int. Cl. H01s 3/09, 3/22
U.S. Cl. 330—4.3                                                4 Claims

ABSTRACT OF THE DISCLOSURE

By means of an expander, the static temperature of laser reactants is caused to remain too low to operate until passed through a converging section which establishes a shock pattern in the flow of reactants. This causes a rise in static temperature and allows a suitable reaction to proceed downstream of the converging section. An optical cavity is located at a proper point in the temperature and reactant concentration profile for efficient laser action. A variety of chemically pumped embodiments are shown.

BACKGROUND OF THE INVENTION

Field of art

This invention relates to gas lasers, and more particularly to a gas laser which utilizes expansion followed by convergence to cause controlled laser reaction to occur within the laser optics.

Description of the prior art

Various forms of gas lasers are known in the art. Among them are reactions wherein a substance capable of photon emission is caused, by molecular transformation, to assume an excited state in which a significant population inversion exists. This in turn results in spontaneous emission of light energy, which, through laser optics, can simulate further emission. The optics selectively amplify or translate the light energy so as to provide a coherent beam thereof, called a laser beam. In order to achieve maximum power or efficiency, it is necessary to control the lasing reaction relative to the optical cavity or optical amplification path of the laser so that advantage may be taken of the maximum amount of photon emission.

SUMMARY OF THE INVENTION

An object of the present invention is to provide an improved gas laser.

According to the present invention, lasing reactions are controlled in a flow of energized reactants by maintaining the static temperature too low for laser operation until a point is reached just upstream of the laser optics, where the static temperature is rapidly increased and lasing ensues. More specifically, the invention utilizes an expansion nozzle to rapidly cool a high energy flow of carrier gas into which at least one laser reactant is mixed at a static temperature low enough to preclude reaction during the mixing process, following which a converging section causes a shock pattern in the flow thereby resulting in a rapid increase in static temperature so that laser reactions can occur.

In further accord with the present invention in one form, molecular transformations are prevented until the reactant passes through the shock pattern, after which transformations occur and one of the products thereof assumes a population-inverted state and thus emits photons for laser operation.

A laser in accordance with the present invention is advantageous in that it is mechanically simple and can be made self-contained with no external power supply required. Further, energy states produced may be exclusively in excited states (i.e., with a sufficient population inversion for laser operation) provided that shocks of suitably high strength are supplied to substances having sufficiently high energy release rates. The present invention is applicable to a wide variety of reactions of both chemical and thermal varieties, and is therefore capable of operation at a wide range of frequencies.

As used herein, "laser" means either an oscillator having an optical cavity or an amplifier which may be no more than an optical path through the lasing region, "optical" herein means visible light and electromagnetic radiation in the near-visual spectrum.

Other objects, features and advantages of the present invention will become more apparent in the light of the following detailed description of preferred embodiments thereof, as illustrated in the accompanying drawing.

DESCRIPTION OF THE DRAWING

The sole figure herein is a partially sectioned, semi-pictorial side elevation of one embodiment of a gas laser in accordance with the present invention, together with a chart illustrating temperature and reactant concentration at various points along the flow within the laser.

DESCRIPTION OF THE PREFERRED EMBODIMENT

A source of relatively inert, highly energized carrier gas may comprise a source 10 of an inert gas such as nitrogen which supplies gas to a chamber 12 within which the gas is brought to a high energy state, such as by heating. The heat may be supplied by an arc 14 powered by a suitable power supply 16. When the carrier gas is energized (heated), it is caused to flow through a converging-diverging nozzle 18 which causes the flow to become supersonic, and rapidly cools it so as to provide a substantial decrease in the translational static temperature of the carrier gas. One or more substances may be injected into the flow of carrier gas from a first source 20 by means of an injection port 22 as well as from a second source 24 by means of an injecting port 26. Downstream of the injection ports 22, 26, is a converging section 28 which causes a normal shock pattern 30 to be formed at the intersection of converging oblique shock patterns. The distance between the injection ports 22, 26 and the converging section 28 should be sufficient, considering the pressure, temperature and relative concentration of gases in the flow, so as to establish a relatively homogeneous mixture of gases all at the same pressure, temperature and velocity prior to entering the converging section 28. The shock wave in the flow causes a substantial increase in the translational static temperature of the gas mixture, so that certain molecular transformations, which cannot occur at low static temperature, will now occur. Laser optic means, such as an optical cavity which may include a mirror 32, is located downstream of the converging section 28 at a point where maximum photon emission may occur (as described more fully hereinafter) so that laser operation will result. The effluent of the laser may be passed through a diffuser 34 (so as to avoid creation of shock patterns that could influence the flow of gases within the laser) and returned to ambient or atmosphere.

One exemplary gas system operable in accordance with the present invention is a system employing Trifluoromethiodide (also known as Perfluromethiodide: $CF_3I$), (hereinafter referred to as "-iodide"). In such a system, the nitrogen flow provides very high velocity for the -iodide, which would be introduced from either or both of the first and second sources 20, 24. It should be noted that either of these sources may be simple injection pipes as illustrated in the figure, or may comprise annular inlet ducts which may be coaxially arranged (in an embodiment requiring two separate sources), or in any other fashion suitable to a given implementation of the present invention. The pressure of the source and the injection inlets 22, 26 are so arranged as to provide -iodide flow of roughly 10% to 20% of the total gaseous flow downstream thereof. This tends to ensure that the high velocity and the given translational static temperature of the nitrogen will be assumed by the -iodide.

As seen in the lower portion of FIG. 1, total temperature, translational static temperature, and excited lasing gas concentration are plotted as a function of distance along the laser itself. The various significant points are identified by lines A–F. Point A is the smallest point of the nozzle, at which the Mach number equals 1. Between Point A and Point B, the nozzle diverges rapidly, causing a marked decrease in static temperature and increase in velocity into the supersonic range. Point C indicates the point at which the -iodide (or other substance) is injected into the flow, which results in a lowering of temperature since the first and second source 20, 24 may supply substances at essentially room temperature. Thus both the total temperature and the translational static temperature may decrease as a result of this cooler gas being injected into the flow. Point D indicates the normal shock wave 30 which causes a rapid substantial increase in the translational static temperature, as the velocity is decreased below the sonic level. As the result of the shock, the translational static temperature increases to very nearly the total temperature. Initially, all of the energy relating to static temperature is translational in nature, because the times required to assume vibrational and rotational energy modes are longer than the time required to assume the translational energy state. At point $D_1$, the translational static temperature has decreased as a result of excitation of rotational energy levels, and at point $D_2$, excitation of vibrational energy levels has resulted in a further lowering of translational static temperature. In any event, between points D and E, the translational static temperature is sufficiently high so that the -iodide undergoes molecular transformation resulting in a constituent in a highly population inverted state: specifically, iodine atoms in a highly energized state, with population inversion of the various energy levels, result as illustrated in the following reactions:

$$N_2 + CF_3I + (Shock\ Energy) \rightarrow CF_3 + I^* + N_2$$

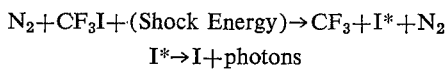

The dissociation of the -iodide takes place in the region between D and E, and as the dissociation begins, the concentration of excited iodine atoms begins increasing. Since it is a population inversion, the natural tendency is for the iodine atoms to emit photons and assume a lower energy level; thus spontaneous emission begins virtually as soon as the iodine atoms exist, and this spontaneous emission in turn causes stimulated emission of further iodine atoms so that an avalanche of photon emission occurs within the laser optics 32, thus creating a useful laser output in the region between E and F. Because the flow velocity in the region is high, the region of laser reaction can cover a relatively large area; i.e., the length of the reaction zone is equal to the average flow velocity multiplied by the de-excitation times of the excited reactants.

It should be understood, of course, that the representation in FIG. 1 is schematic in nature, and not necessarily accurate as to amplitudes or duration of time; rather, the illustration has been simplified and schematicized for clarity.

In another embodiment of the invention, hydrogen and chlorine may be provided by the first and second sources 20, 24, respectively, and no reaction takes place until the static temperature is increased by the substances flowing through the converging setcion 28. Between point D and E in the figure, the following reactions occur:

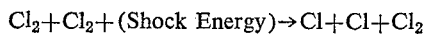

$$H_2 + H_2 + (Shock\ Energy) \rightarrow H + H + H_2$$

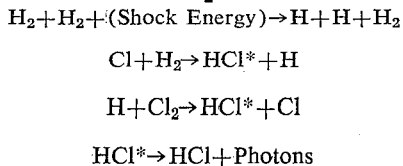

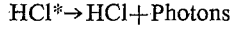

In these reactions, there is indicated the fact that some of the molecular chlorine dissociates into atomic chlorine and some of the molecular hydrogen dissociates into atomic hydrogen. The atomic chlorine is more likely to combine with molecular hydrogen, and the atomic hydrogen is more likely to combine with the molecular chlorine. The atomic hydrogen and chlorine are not so likely to combine. In either case, additional molecular chlorine and hydrogen is formed along with excited hydrogen chloride; the reactions can proceed until there is a substantial transformation of all the molecules and atoms into excited hydrogen chloride.

As is true with the previous embodiment, if the pressures and flow rates are so adjusted, a point is reached where substantially all photon emission occurs, and the optical system 32 can be located at that point in the flow so as to make maximum utilization of the photon emission in deriving a useful laser output.

The source of highly energized carrier gas illustrated herein includes a source 10 of nitrogen, which may be at some suitable pressure such as on the order of magnitude of 300 p.s.i., being passed through a chamber 12 where it may be heated to some 3000 to 4000° R. by an arc 14. Another suitable form would be to utilize a fuel and an oxidant so that the combustion process will supply the energy required in a carrier gas, such as by the hydrogen-rich oxidation of hydrogen with air which will supply heated nitrogen and traces of water. A combustion means may be most useful. Other suitable arrangements may be utilized so as to provide an inert carrier gas at a high temperature. Also, gases other than nitrogen (such as argon) may be utilized; however, nitrogen, is relatively inexpensive and easily adapted to the needs of the present invention.

Although the gaseous output of the laser herein is shown to comprise a diffuser 34, the purpose of which is merely to avoid side reactions as a result of shock patterns caused by venting the laser to atmosphere, the output therefrom may be utilized to drive a turbine which in turn may assist in compressing the inert gas to a suitably high temperature, or may be used to drive a generator for supplying electrical power useful in the heating of the carrier gas. Such expedients are not a part of the invention, and variations therein are believed to be within the skill of the art.

The foregoing are examples merely of molecular recombinations which may utilize the present invention. The substantial point of the present invention however, is that a highly energized carrier gas may be provided with a very low static temperature and a high velocity, and that suitable substances may have similar low static temperature and high velocity provided thereto by being injected into the flow of carrier gas. Thereafter, passage of the flow through a converging nozzle so as to significantly elevate the static temperature thereby causing molecular recombinations which result in at least one constituent substance in a population-inverted state will result in laser operation.

Although the invention has been shown and described with respect to preferred embodiments thereof, it should be understood by those skilled in the art that the foregoing and other various changes and omissions in the form and detail thereof, may be made therein without departing from the spirit and the scope of the invention.

Having thus described typical embodiments of my in- vention, that which I claim as new and desire to secure by Letters Patent of the United States is:

1. A gas laser comprising:
   first means providing a flow of a substance which is relatively inert in a high energy state;
   a nozzle for rapidly cooling said substance and causing said flow to assume a supersonic velocity, said nozzle being located downstream from said first means in said flow;
   means for injecting and mixing a second substance into said flow downstream of said nozzle, said second substance having a characteristic of chemical reaction at temperatures higher than the temperatures at which it is mixed with said flow, at least one reacted constituent of said second substance being in a population inverted state upon reaction, said population inverted constituent capable of significant photon emission suitable for laser operation;
   a converging section disposed downstream of said injecting means relative to the flow of said substances along said path, said converging section providing a shock wave in the flow of said substances, said shock wave causing a marked increase in the static temperature of said substances, whereby said second molecular substance dissociates or reacts;
   laser optic apparatus located downstream of said converging section at a determinable point inclusive of maximum photon emission from at least one constituent of said substances.

2. The laser according to claim 1 wherein said second substance consists of trifluromethiodide.

3. A gas laser comprising:
   first means providing a supersonic flow of a relatively inert substance which is relatively inert in a high energy state;
   a nozzle for rapidly cooling said substance, said nozzle being located downstream from said first means in said flow;
   means for injecting and mixing at least two reactant substances into said flow downstream of said nozzle, said reactant substances capable of chemically reacting with one another at a temperature higher than that at which said substances are mixed so as to provide a population inverted substance capable of photon emission suitable for laser operation;
   a converging section disposed downstream of said injecting means relative to the flow of said substance along said path, said converging section providing a shock wave in the flow of said substances, said shock wave markedly increasing the static temperature of said substances, said reactant substances thereby coacting to provide at least one substance capable of laser operation;
   and laser optic apparatus located downstream of said converging section at a determinable point inclusive of maximum photon emission from said population inverted substance.

4. The laser according to claim 3 wherein said reactant substances consist of hydrogen and chlorine.

References Cited
UNITED STATES PATENTS 3,302,127  1/1967  Lin _____ 331—94.5

RICHARD R. FARLEY, Primary Examiner

D. C. KAUFMAN, Assistant Examiner

U.S. Cl. X.R.

331—94.5